United States Patent
Pickens

(10) Patent No.: US 8,302,344 B2
(45) Date of Patent: Nov. 6, 2012

(54) FISHING LURE RETRIEVER

(76) Inventor: Frank D. Pickens, Montgomery, TX (US)

( * ) Notice: Subject to any disclaimer, the term of this patent is extended or adjusted under 35 U.S.C. 154(b) by 295 days.

(21) Appl. No.: 12/874,582

(22) Filed: Sep. 2, 2010

(65) Prior Publication Data

US 2012/0055066 A1 Mar. 8, 2012

(51) Int. Cl.
*A01K 97/24* (2006.01)
(52) U.S. Cl. .......................................... 43/17.2
(58) Field of Classification Search .................. 43/17.2
See application file for complete search history.

(56) References Cited

U.S. PATENT DOCUMENTS

| | | | | |
|---|---|---|---|---|
| 2,175,135 A * | 10/1939 | Sorenson et al. | ............. | 43/17.2 |
| 2,482,037 A * | 9/1949 | Swaim | ............. | 43/17.2 |
| 2,651,132 A * | 9/1953 | Lennen | ............. | 43/17.2 |
| 2,676,430 A * | 4/1954 | Richard | ............. | 43/17.2 |
| 2,732,650 A * | 1/1956 | Passmore, Jr. et al. | ........ | 43/17.2 |
| 2,761,235 A * | 9/1956 | Payne | ............. | 43/17.2 |
| 2,764,833 A * | 10/1956 | Clark | ............. | 43/17.2 |
| 2,793,457 A * | 5/1957 | Gaynes | ............. | 43/17.2 |
| 2,807,905 A * | 10/1957 | Ford | ............. | 43/17.2 |
| 2,809,460 A * | 10/1957 | Taylor | ............. | 43/17.2 |
| 3,012,355 A * | 12/1961 | Cottreil | ............. | 43/17.2 |
| 3,156,064 A * | 11/1964 | Czirr | ............. | 43/17.2 |
| 3,191,335 A * | 6/1965 | Sobetzer | ............. | 43/17.2 |
| 3,224,132 A * | 12/1965 | Frantz | ............. | 43/17.2 |
| 3,382,599 A * | 5/1968 | Beverley | ............. | 43/17.2 |
| 3,404,482 A * | 10/1968 | Maske | ............. | 43/17.2 |
| 3,601,920 A * | 8/1971 | Mason, Jr. | ............. | 43/17.2 |
| 3,628,279 A * | 12/1971 | Halone | ............. | 43/17.2 |
| 3,688,429 A * | 9/1972 | Mauck | ............. | 43/17.2 |
| 3,729,854 A * | 5/1973 | Satama | ............. | 43/17.2 |
| 3,735,520 A * | 5/1973 | Jarrett | ............. | 43/17.2 |
| 3,769,734 A * | 11/1973 | Winkler | ............. | 43/17.2 |
| 3,772,815 A * | 11/1973 | Burgess | ............. | 43/17.2 |
| 3,987,573 A * | 10/1976 | Clayton | ............. | 43/17.2 |
| 4,085,537 A * | 4/1978 | Todd | ............. | 43/17.2 |
| 4,408,411 A * | 10/1983 | Skarnells | ............. | 43/17.2 |
| 4,598,493 A * | 7/1986 | O'Brien et al. | ............. | 43/17.2 |
| 4,986,022 A * | 1/1991 | Wilkinson | ............. | 43/17.2 |
| 5,081,784 A * | 1/1992 | Santucci et al. | ............. | 43/17.2 |
| 5,157,856 A | 10/1992 | Packer | | |
| 5,485,696 A * | 1/1996 | Barton | ............. | 43/17.2 |
| 6,305,119 B1 | 10/2001 | Kacak | | |
| 6,442,886 B1* | 9/2002 | McAfee et al. | ............. | 43/17.2 |
| D545,937 S | 7/2007 | Heuke | | |
| 7,451,567 B2 | 11/2008 | Irvine | | |
| 2002/0144450 A1* | 10/2002 | Caraway | ............. | 43/17.2 |

FOREIGN PATENT DOCUMENTS

FR 2727604 A1 * 6/1996

(Continued)

*Primary Examiner* — Darren W Ark
(74) *Attorney, Agent, or Firm* — R. William Graham

(57) ABSTRACT

A lure retriever for retrieving a snagged fishing lure attached to a fishing line includes a hollow central body member having a first threaded end and a second end, and a longitudinal slot extending through part of the central body member, at least one chain member connected to the central body member, and a first end cap having a complementary threaded surface to enable threaded connection to said first threaded end and having a longitudinal slot extending at least through part of the first end cap and wherein when the first cap is connected to the first threaded end the slots can be both positioned in alignment to permit line passage therethrough and nonalignment to prevent line passage therethrough.

5 Claims, 3 Drawing Sheets

FOREIGN PATENT DOCUMENTS

| | | | | |
|---|---|---|---|---|
| FR | 2799934 | A1 | * | 4/2001 |
| GB | 2369762 | A | * | 6/2002 |
| JP | 07327570 | A | * | 12/1995 |
| JP | 09172933 | A | * | 7/1997 |
| JP | 2001017052 | A | * | 1/2001 |
| JP | 2003111549 | A | * | 4/2003 |

* cited by examiner

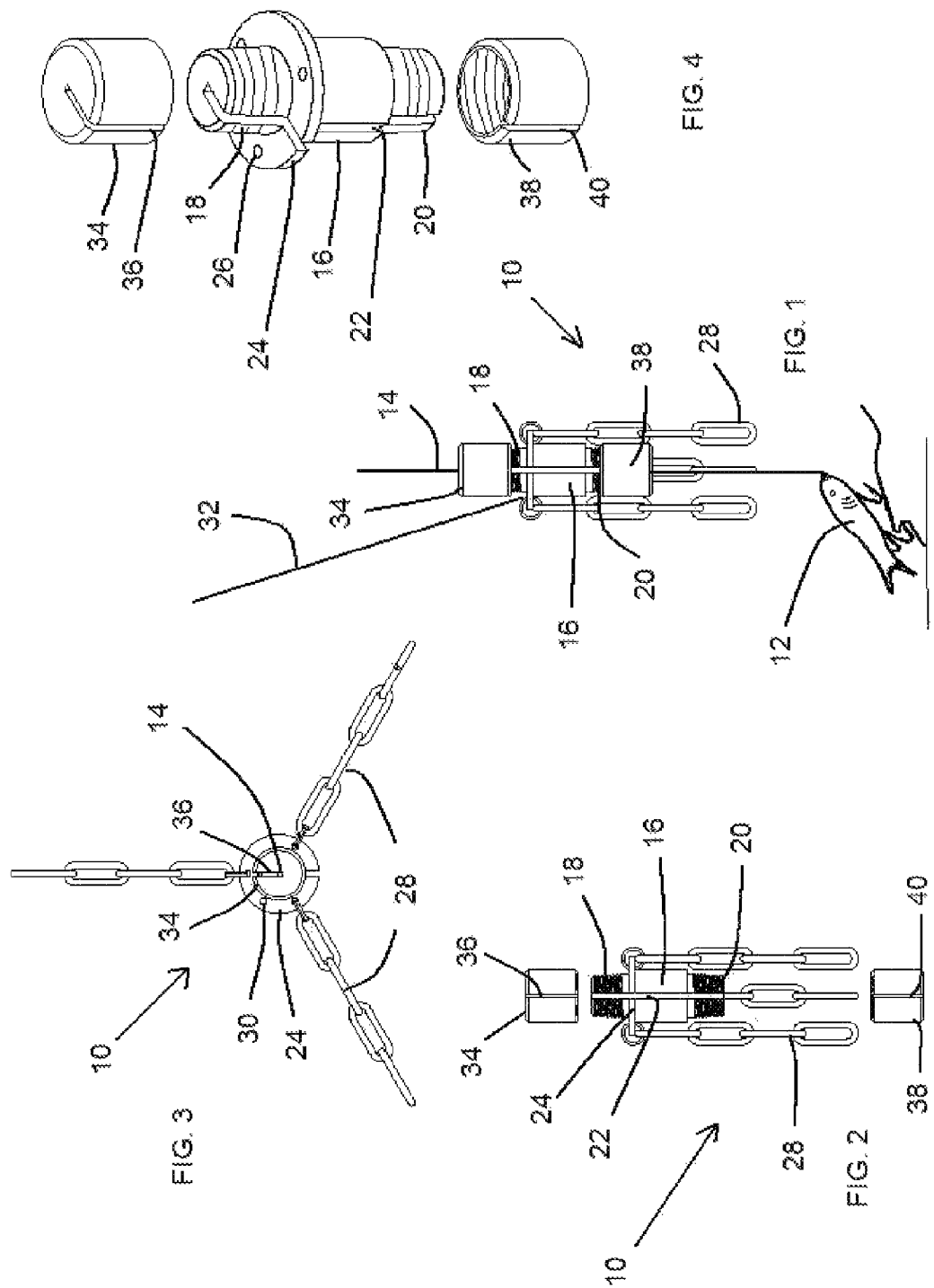

FISHING LURE RETRIEVER

FIELD OF INVENTION

The present invention is generally related to a device for a retrieving fishing lure which becomes snagged upon an object beneath the water. More particularly, but not by way of limitation, the invention is directed to a fishing lure retriever which will remove a lure from various objects without damage to the lure body and which precludes line disengagement and entanglement with the objects.

BACKGROUND OF THE INVENTION

In sport and recreational fishing, fishing lures with multiple hooks are often used as a substitute for live bait or as the preferred form of fish attractant. Some lures can be very expensive and include arrays of multiple hooks attached to the end of the fish profile or lure body. The hooks of the lure make it prone to snagging on an object. This often occurs when fishing over coral, rocks or submerged tree branches.

As a result, fishing lure retrievers have been developed with the aim of retrieving snagged lures. Unfortunately, snagged lures are not generally visible to the angler and thus anglers may try different types of retrievers to free a lure from an object. Generally, lure retrievers fall into three broad categories: "break away," "extendable pole" and "sliders."

"Break away" lure retrieval devices are designed to incorporate a weak link between the lure body and the hook(s). If a hook of the lure becomes snagged, the angler can intentionally break the link between the body and the hook; thereby leaving the hook, but retrieving the lure body. This has been previously noted to have its deficiencies.

"Extendable pole"—type devices comprise extendable rods or poles, typically having a predetermined length and are of limited use and lack user friendliness.

"Slider" type devices attach to the actual fishing line and slide down the fishing line to the snagged lure. Slider retrievers can include knockers, chain-type devices or latching devices. Knockers are used to knock loose the lure. Chain-type devices combine the use of a weight with a series of chains. The weight is threaded onto the fishing line and allowed to slide down to the snagged lure. The chains are jostled in an attempt to ensnare a free hook of the lure. Once a chain is hooked onto the lure, the whole assembly is pulled to free the lure. Latching devices are slid down to the fishing line to the snagged lure, where they latch onto the lure by a device to grab the snagged lure and then the device is pulled back up.

Anglers may carry many types of lure retrievers to cope with the variety of snag situations which could occur. While the prior devices have met with some prior success, the present invention provides an improvement over the art which deals with a wide variety of snagged lure situations and quick and effective means for retrieving snagged lures. Further, the present invention aims to alleviate and address some of the disadvantages of other fishing lure retrieval devices described above and otherwise present in the art, to provide an improved, convenient, easily manufactured lure retrieval device.

SUMMARY OF THE INVENTION

It is an object to improve fishing.
It is another object to provide an improved lure retrieval device.
Another object is to provide a lure retriever which achieves the lure with minimal damage to the line or body.
Still another object is to provide a lure retriever which is user friendly.
Accordingly, it is an object of the present invention to provide a new fishing lure retrieval device which may be easily and efficiently manufactured and marketed.
It is a further object of this invention to provide a new fishing lure retriever which is of a durable and reliable construction.
Another object of the invention is to provide a new fishing lure retriever which manufactured at low cost in materials and labor.
Still another object of the present invention is to provide a new fishing lure retriever which is convenient to carry, use and store.

Accordingly, a preferred embodiment the present invention provides a lure retriever for retrieving a snagged fishing lure attached to a fishing line comprising:

A hollow central body member having a first threaded end and a second threaded end, and a longitudinal slot extending through part of the central body member;

At least one chain member connected to the central body member;

A first end cap having a complementary threaded surface to enable threaded connection to said first threaded end and having a longitudinal slot extending at least through part of the first end cap and wherein when the first cap is connected to the first threaded end the slots can be both positioned in alignment to permit line passage therethrough and nonalignment to prevent line passage therethrough; and A second end cap having a complementary threaded surface to enable threaded connection to said second threaded end and having a longitudinal slot extending at least through part of the second end cap and wherein when the second cap is connected to the second threaded end the slots can be both positioned in alignment to permit line passage therethrough and nonalignment to prevent line passage therethrough. Each of the ends of the central body member can include an outer male threaded surface and the end caps can each include an inner female threaded surface.

The central body member can have a collar extending radially outward therefrom. The collar can have a plurality of holes therethrough which can preferably be equidistantly positioned, wherein a chain extends through each hole. Additionally, the collar can also include another hole to which a retrieval line can be attached.

The retriever can preferably be made of a non-corrosive metal, plastic and or combination of both material of a density sufficient to sink in freshwater and in saltwater. The chains can preferably extend beyond the length of the retriever once connected thereto.

This section has outlined, rather broadly, the more important features of the invention and the detailed description thereof that follows may be better understood, and the present contribution to the art may be better appreciated. Of course, additional features of the invention will be described hereinafter and which will form the subject matter of the claims appended hereto.

Those of skill in the art will appreciate that the conception, upon which this disclosure is based, may readily be utilized as a basis for the design of other structures, methods and systems for carrying out the several purposes of the present invention.

It is important, therefore, that the claims be regarded as including such equivalent constructions insofar as they do not depart form the spirit and scope of the present invention.

BRIEF DESCRIPTION OF THE DRAWINGS

A better understanding of the nature and objects of this invention is made with reference to the following detailed description, taken in consideration with the accompanying drawings which form a part of this specification. Numerals of reference used in the detailed description correspond to parts similarly numbered in the figures, wherein:

FIG. 1 is a side view of an embodiment of the invention in an assembled form.

FIG. 2 is a side view of an embodiment of the invention in a partly assembled form.

FIG. 3 is a top is a view of an embodiment of the invention.

FIG. 4 is a perspective view of parts of the invention in an exploded form.

DETAILED DESCRIPTION OF THE INVENTION

Figure 5:
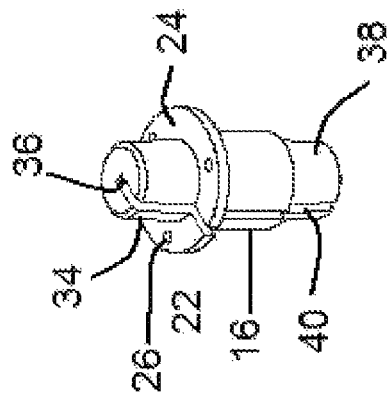
FIG. 5 shows the parts in FIG. 4 in assembled form.
Figure 7:
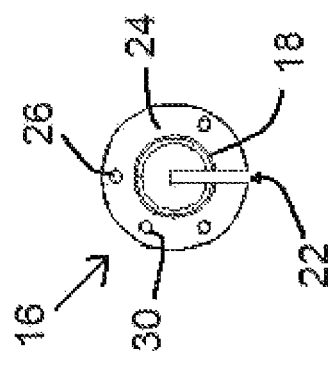
FIG. 7 is a top view of the part in FIG. 6.
Figure 6:
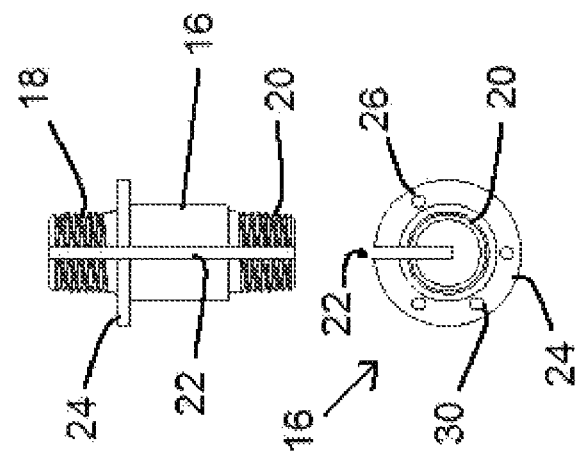
FIG. 6 is a side view of a part of the invention.
Figure 8:
FIG. 8 is a bottom view of the part in FIG. 6.
Figure 9:
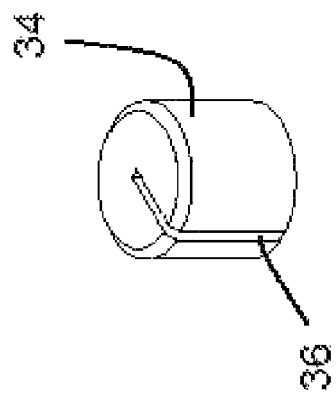
FIG. 9 is a side view of another part of the invention.
Figure 10:
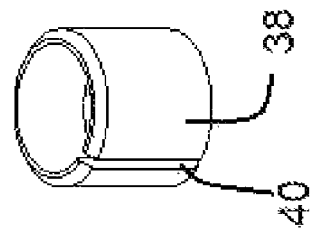
FIG. 10 is a perspective view of another part of the invention.
Figure 12:
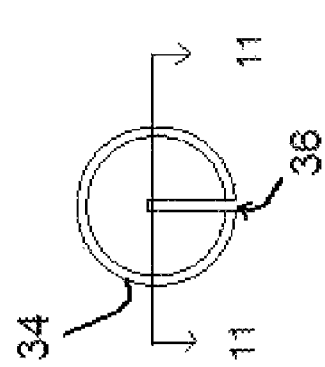
FIG. 12 is a bottom view of the part in FIG. 9.
Figure 11:
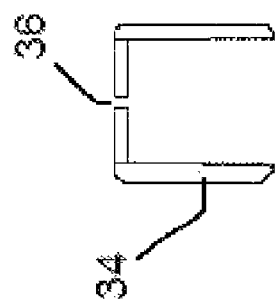
FIG. 11 is a cross section through the part in FIG. 12.
Figure 13:
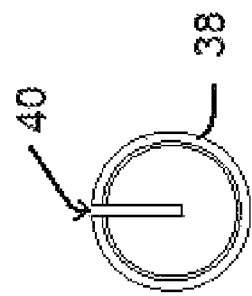
FIG. 13 is a top view of FIG. 9.

Referring now to the drawings, the fishing lure retriever of the instant invention is generally designated by the numeral 10. The lure retriever 10 is exceptionally well suited for retrieving a snagged fishing lure 12 attached to a fishing line 14.

The lure retriever 10 includes a hollow central body member 16 having a first male threaded end 18 and a second male threaded end 20. A longitudinal slot 22 extends through part of the central body member 16.

The central body member 16 can have a collar 24 extending radially outward therefrom. The collar 24 can have a plurality of holes 26 therethrough which can preferably be equidistantly positioned about the collar 24. A chain 28 extends through each hole 26 in a manner to be retained on the collar 26. Additionally, the collar 24 can also include another hole 30 to which a retrieval line 32 can be attached. The retrieval line 32 is to be of sufficient tensile strength to prevent breaking during the stress created while extracting the lure 12 by pulling the retrieval line 32 from the water surface.

A first end cap 34 has an inner female complementary threaded surface to enable threaded connection to the first threaded end 18 and has a longitudinal slot 36 extending through part of the first end cap 34. The first end cap 34 can be connected to the first threaded end 18 such that the slots 36 and 22 can be both positioned in alignment to permit passage of line 14 therethrough and in nonalignment to prevent passage of line 14 therethrough as illustrated in FIGS. 1 and 4. A second end cap 38 has an inner female complementary threaded surface to enable threaded connection to the second threaded end 20 and has a longitudinal slot 40 extending through part of the second end cap 38. The second cap 38 can be connected to the second threaded end 20 such that the slots 22 and 40 can be both positioned in alignment to permit passage of line 14 therethrough and in nonalignment to prevent passage of line 14 therethrough. By providing both end caps 34 and 38, the invention achieves a slot locking mechanism by which the line is retained within the inner area of the central body member 16.

The retriever 10 can preferably be made of a non-corrosive metal, plastic and or both and a material of a density sufficient to sink in freshwater and in saltwater. The retriever 10 is of sufficient thickness and diameter to permit a rapid but not excessive descent. The thickness and diameter are such that there is sufficient weight to carry the device down the line 14 to the snagged lure 12, but not damage it. The chains 28 can preferably extend beyond the length of the central body member 16 once connected thereto and can be rotated by the retriever line 32 to knock loose the lure 12.

The retriever 10 provides a rapid mechanism to engage the line 14 attached to the lure 12. Time is of the essence when retrieving a lure due to wind and water currents, and the tensile strength of the line 14. The surface of the retriever is smooth to prevent severing the line 14 and once retained within the retriever aids in further preventing the line from entanglement.

Those of skill in the art will appreciate that the conception, upon which this disclosure is based, may readily be utilized as a basis for the design of other structures, methods and systems for carrying out the several purposes of the present invention. It is important, therefore, that the claims be regarded as including such equivalent constructions insofar as they do not depart form the spirit and scope of the present invention.

The configuration show is exemplary in the figure and it is contemplated other such configurations can be derived. The weight, or density, of the retriever 10 provides an exceptional knocker type device. As discussed above, knocker devices slide along the fishing line and are weighted so as to hit the snagged lure with force—thereby 'knocking' the snagged lure free. In embodiments of the present invention, the fishing lure retriever is of a weight sufficient to knock the snagged lure loose and the chains 28 can be further used in this regard and to latch onto a hook to aid in retrieval of the lure. The particular configuration assures the line 14 will not be lost from the retriever 10. The advantages of the present invention are apparent and achieve the objectives set forth above.

The foregoing is considered as illustrative only of the principles of the invention. Numerous modifications, derivations and changes will readily occur to those skilled in the art and all may be equivalents falling within the scope of the invention.

What is claimed is:

1. A lure retriever for retrieving a snagged fishing lure attached to a fishing line, comprising:

a hollow central body member having a first threaded end and a second end, and a first longitudinal slot extending through part of said central body member, said second end of said central body member being threaded, and said central body member having a collar extending radially outwardly therefrom at a location between said first and second threaded ends and including at least one hole therethrough;

at least one chain member connected to said central body member, said at least one chain member extending through said at least one hole;

a first end cap having a complementary threaded surface to enable threaded connection to said first threaded end and having a second longitudinal slot extending at least through part of said first end cap; and a second end cap having a complementary threaded surface to enable threaded connection to said second threaded end and having a third longitudinal slot extending at least through part of said second end cap, and wherein when said first and second caps are connected to said first and second threaded ends, said first, second, and third slots can be both positioned in alignment to permit line passage therethrough and nonalignment to prevent line passage therethrough.

2. The lure retriever of claim 1, wherein said at least one hole of said collar comprises a plurality of holes through said collar which are equidistantly positioned about said collar, said at least one chain member comprises a plurality of chain members, and wherein a respective chain member extends through each of said plurality of holes.

3. The lure retriever of claim 1, wherein said collar includes another hole and includes a retriever line passing therethrough connected to said collar.

4. The lure retriever of claim 1, wherein said retriever is made of a non-corrosive material of a density sufficient to sink in freshwater and in saltwater.

5. The lure retriever of claim 1, wherein said at least one chain member comprises a plurality of chain members, said plurality of chain members can preferably extend beyond a length of said hollow central body member once connected thereto.

* * * * *